C. WOLF.
CAR.
APPLICATION FILED OCT. 1, 1910.
998,222.
Patented July 18, 1911.
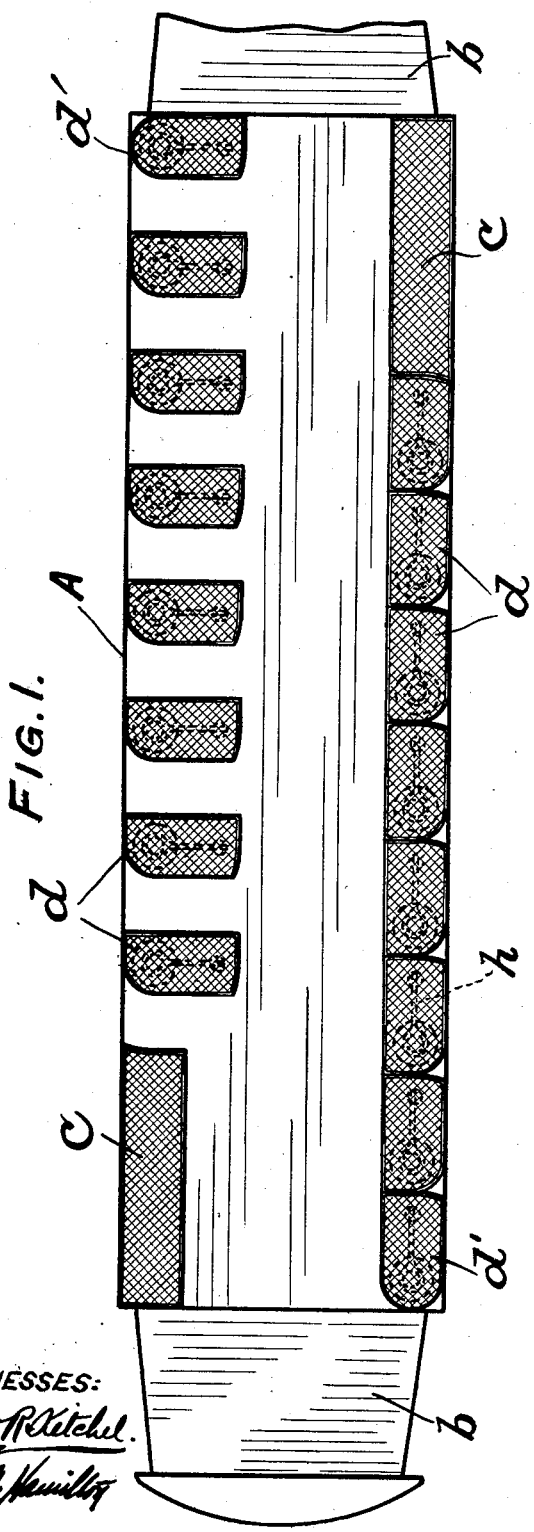
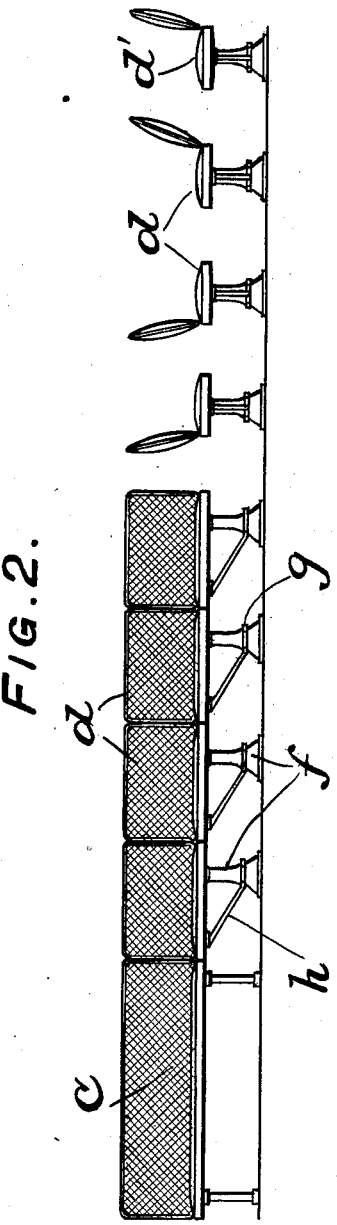
WITNESSES:
INVENTOR

UNITED STATES PATENT OFFICE.

CLARENCE WOLF, OF PHILADELPHIA, PENNSYLVANIA.

CAR.

998,222.

Specification of Letters Patent. Patented July 18, 1911.

Application filed October 1, 1910. Serial No. 584,793.

*To all whom it may concern:*

Be it known that I, CLARENCE WOLF, a citizen of the United States, residing at Philadelphia, county of Philadelphia, and State of Pennsylvania, have invented a new and useful Improvement in Cars, of which the following is a full, clear, and exact description, reference being had to the accompanying drawings, which form a part of this specification.

The object of my invention is to so construct a street railway car that the seat arrangement may be altered to adapt the car to different conditions of service.

In ordinary street cars, two arrangements of seats are in vogue, one in which two extended seats are arranged longitudinally along opposite sides of the car, and one in which two rows of transversely extending seats, arranged along opposite sides of the car, are separated by a central aisle. The latter arrangement is preferred by many riders, but it does not lend itself readily to the type of car known as the "pay within," in which car the conductor is stationed at a point within the car located along the longitudinal center line thereof, and therefore, in such position as to block the entrance to a narrow aisle. Further, the car in which the seat arrangement is transverse creates uncomfortable crowding during the early morning and late afternoon hours, especially in the larger cities, when the rush of travel is so great that, even with the maximum equipment in service, seats cannot be provided for more than a certain proportion of riders. In a car having seats constructed and arranged according to my invention, means are provided whereby a longitudinal arrangement of seats may be converted into a prevailing transverse arrangement, while at the same time no obstruction to the admission of passengers will be afforded by stationing the conductor at either end of the car.

The invention consists, in part, of the general scheme of arrangement whereby a portion of the seats are fixed and a portion convertible, and in part of the specific means whereby the seats are rendered convertible.

In the drawings: Figure 1 is a diagrammatic plan view of a car embodying my invention. Fig. 2 is an elevational view of the seats on one side of the car, the convertible seats being shown in both positions.

A is the car body, and $b$, $b$, the car platforms. At each end of the car is provided a fixed longitudinally extending seat $c$ of a length approximately equal to the space measured lengthwise, occupied by two transverse seats. The seats $c$ are on opposite sides of the car respectively. Pivoted on vertical axes are a number of convertible seats $d$. The convertible seats are arranged on each side of the car, between the fixed end seat and the opposite end of the car. Each convertible seat is of a length substantially corresponding to the length of an ordinary transversely-arranged seat—that is, of a length sufficient to comfortably accommodate two adult persons. The axis of the seat is midway between its front and rear edges, and near the end of the seat adjoining the side of the car when the seat is in its transversely-extending position. In the drawings the seat is shown as pivoted in a fixed standard $f$, the latter being cut away, near its lower end, around its periphery to receive a ring $g$, from which extends upward, in an inclined direction, a bracket or stanchion $h$ secured to the bottom of the seat near its outer or free end.

One longitudinal edge (say the rear edge) of each pivoted seat $d$ is straight from end to end. The end edges of each seat $d$ extend from the rear edge at right angles thereto for about half the width of the seat. Thence each end edge is curved toward the front longitudinal edge on an arc concentric with the pivot of the seat. The pivot of the seat is equi-distant from the longitudinal edges and one of the end edges, so that, dependent upon to which of its positions a seat $d$ is swung, either the front longitudinal edge or the last named end edge will abut against the side wall of the car-body. The front longitudinal edge of the seat is straight except where it is curved to meet and merge with the curved edge of the pivoted end of the seat.

Each seat $d'$ (namely, that movable seat on each side of the car that is located at one extreme end of the car opposite the fixed seat on the other side of the car) is constructed like the seats $d$, except that the edge of the pivoted end of the seat is curved, on an arc concentric with the pivot of the seat, toward both longitudinal edges of the car, whereby the pivoted end is of semi-circular convex form as shown.

The length of each seat $d$ is such that when the seats $d$ are swung into their longitudinal position, they will form, in connection with the fixed seats $c$, two long seats extending from end to end of the car on opposite sides thereof.

It will be observed that when the seats $d$ are in their longitudinal positions, they cannot be swung into their transverse positions, except by first swinging out the seat at one end marked $d'$ and then swinging out the other seats successively in regular order. Conversely, when the seats $d$ are in their transverse positions they cannot be swung into position to form a continuous lengthwise-extending seat except by swinging in the seats in the inverse order in which they are capable of swinging out.

The backs of the seats may of course be arranged to swing from one edge to the other of the seats in the usual way, and what I have heretofore called the front edge of a seat will then become the rear edge and vice versa. It will therefore be understood that the terms front edge and rear edge are used for convenience of description and not as indicative of fixed conditions.

It will be understood that by making only a part of the seats convertible and by maintaining two fixed longitudinally extending seats at opposite ends and on opposite sides of the car, a conductor may be stationed at either end of the car without blocking ingress of the passengers, as there is ample room in front of either fixed end seat for passengers to pass from the platform to the interior of the car.

Having now fully described my invention, what I claim and desire to protect by Letters Patent is:

1. In a car, in combination, a series of seats arranged on each side of the car and pivoted on fixed vertical axes located adjacent to the outside of the car, said seats each being of a length substantially less than half the width of the car and substantially equal to the distance between corresponding longitudinal edges of adjacent seats when the same are swung into transverse positions, all of the seats of a series being adapted to swing in the same directions from longitudinal positions to transverse positions and vice versa, and two fixed seats, each of substanially greater length than any of the pivoted seats, extending longitudinally and located at opposite ends and along opposite sides of the car and adapted, when the pivoted seats are swung into their longitudinal positions, to form with them two seats extending continuously on opposite sides of the car from one end thereof to the other.

2. In a car, in combination, a series of seats arranged on each side of the car, each seat being pivoted on a fixed vertical axis near the end edge thereof adjoining the outside of the car, one of the longitudinal edges of each seat being substantially straight from end to end while the end edges extend from said longitudinal edge for about half the width of the seat and thence are curved toward the opposite longitudinal edge on arcs concentric with the pivot of the seat.

In testimony of which invention, I have hereunto set my hand, at Philadelphia, on this 29th day of September, 1910.

CLARENCE WOLF.

Witnesses:
F. A. BARNETT,
E. H. ROBINSON.